(12) United States Patent
Held

(10) Patent No.: US 9,656,540 B2
(45) Date of Patent: May 23, 2017

(54) METHOD FOR INCREASING TRAVEL TIME FOR OPEN-AIR CARTS WITHOUT REQUIRING BATTERY CHARGING

(71) Applicant: Michael P. Held, Orchard Park, NY (US)

(72) Inventor: Michael P. Held, Orchard Park, NY (US)

(*) Notice: Subject to any disclaimer, the term of this patent is extended or adjusted under 35 U.S.C. 154(b) by 0 days.

(21) Appl. No.: 15/064,927

(22) Filed: Mar. 9, 2016

(65) Prior Publication Data

US 2016/0268561 A1 Sep. 15, 2016

Related U.S. Application Data

(60) Provisional application No. 62/130,275, filed on Mar. 9, 2015.

(51) Int. Cl.
*B60K 1/04* (2006.01)
*H01M 2/10* (2006.01)

(52) U.S. Cl.
CPC .............. *B60K 1/04* (2013.01); *H01M 2/1083* (2013.01); *B60K 2001/0411* (2013.01); *B60K 2001/0416* (2013.01); *B60Y 2200/23* (2013.01); *H01M 2220/20* (2013.01)

(58) Field of Classification Search
CPC ............. H01M 2/1072; H01M 2/1077; H01M 2/1083; H01M 2220/20; B60K 1/04; B60K 2001/0405; B60K 2001/0455; B60K 2001/0477; B60K 2001/0411; B60K 2001/0416; B60R 16/04; B60Y 2200/23

USPC ........................ 180/2.1, 68.5, 65.8
See application file for complete search history.

(56) References Cited

U.S. PATENT DOCUMENTS

| | | | | |
|---|---|---|---|---|
| 4,042,054 A * | 8/1977 | Ward | ...................... | B60K 1/04 180/60 |
| 6,406,812 B1 * | 6/2002 | Dreulle | ............... | H01M 2/1083 180/68.5 |
| 7,413,045 B2 * | 8/2008 | Tien | ........................ | B60R 16/04 180/68.5 |
| 8,728,648 B2 * | 5/2014 | Choo | .................. | B60L 11/1877 180/68.5 |
| 2007/0269713 A1 * | 11/2007 | Hanson | ................... | B60R 16/04 429/99 |
| 2015/0280188 A1 * | 10/2015 | Nozaki | .................... | B60K 1/04 429/156 |

* cited by examiner

*Primary Examiner* — John Walters
(74) *Attorney, Agent, or Firm* — Patricia M. Costanzo

(57) ABSTRACT

A battery reserve system for open-air carts and a method for its use are taught. The system contains a reserve battery bank and custom designed brackets, compatible with and attachable to small, low-speed car frameworks currently structured to hold only a single battery bank, to support the reserve batteries while maintaining the cart's balance and stability and for use with newly built enlarged carts. The reserve battery system increases the currently available cart's travel distance to minimally twice the distance provided by the cart's single battery bank without requiring battery charging. One currently available electrically powered golf cart is a Yamaha DRIVE®. The reserve bank of batteries can be a 48-Volt bank of any desired configuration. A battery disconnect switch for connecting or disconnecting the reserve battery bank with the initial battery bank of the electrically powered golf-cart is provided. Space for golf bags and other accessories is maintained.

20 Claims, 6 Drawing Sheets

METHOD FOR INCREASING TRAVEL TIME FOR OPEN-AIR CARTS WITHOUT REQUIRING BATTERY CHARGING

CROSS-REFERENCE TO RELATED APPLICATIONS

This is a Non-Provisional Application of Provisional App. 62/130,275, filed Mar. 9, 2015.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to electrically-powered vehicles and, more particularly, to a Battery Reserve System™ for electrically-powered open-air carts.

The background information discussed below is presented to better illustrate the novelty and usefulness of the present invention. This background information is not admitted prior art.

The use of open-air cart cars, such as golf carts, is growing exponentially. At first, golf carts were used mainly as transport on golf courses, but in the last 10 years the use of golf carts for more general transportation has exploded. Entire communities are now designed around the use of golf carts. One example is Peachtree City, Ga., a town of 35,000, with most every family having at least one low-speed, low-carbon producing vehicle. About 10,000 of these carts are roaming the 90 miles of cart-compatible paths for people to pick up groceries, take kids to school, and doing all the short trips that make up so much of daily driving. Many drivers now refer to their golf-carts as "their second car" that is used not only within the village, but outside of the village as well, to drive to shopping centers and medical facilities, on nearby highways. Another golf cart community is The Villages, which is the largest active adult community in the world with approximately 75,000 homes. This Villages has over 100 miles of golf cart legal streets and trails that connect 26 executive courses, nine championship golf courses, other recreation venues, shopping and dining facilities, and medical and professional services all just a golf car ride away, in a beautifully designed and gated community. Based on the fact that more people are relocating to such golf cart centered communities, many more of these communities are being built with even more planned. It is clear that the demand for golf carts offering more amenities will be growing to match the growth of the communities that are designed around their use.

Such open-air carts are now street-legal in at least 45 states, which means that they are driven under a variety of weather conditions ranging from very warm to very cold, windy, rainy, and even snowy. Thus, open-air cars now typically come with a roof and a windshield panel. Additional, side enclosures protect the occupants of the car from the elements, including wind, cold, snow, and rain. Originally golf carts were electrically powered, but in time gasoline-powered variants started to occur as the use of the carts became mover diverse. The electrically-powered carts would be preferred in many communities where their lack of pollutants, lack of noise, and safety for pedestrians and other carts (due to slow speeds) are beneficial, but their travel distance range is limited. When purpose-built for general transportation these are called Neighborhood Electric Vehicles (NEVs), but there are various operating limitations such as top speed and heavy regulation on which type of streets these types of carts are permitted to be used. These may resemble the typical open-air golf carts, although some are now being made with all-weather car-like bodies. Electric cart motors generally have a life span of anywhere from 5000 to 8000 hours as compared to E-Z-Go's four cycle 1250 hours engine life, Yamaha's four cycle 2500 hours, and Club Car's four cycle 4250 hours. Moreover, electric cart motors can be rebuilt for 25 percent of the cost of a cart's gas engine. And, unlike an automobile, there is no transmission or clutches in an electrically-powered cart. A 2-3 horsepower electric motor can produce 10 to 12 horsepower for short durations of time and can easily move a 5000 pound trailer. For safety, golf cars are limited to a speed of 12-18 mph regardless of horsepower. Batteries can last from 3 to 8 years with routine maintenance.

SUMMARY

As mentioned, electrically-powered open-air carts run nearly silently and do not emit green-house gases or unpleasant smelling and potentially dangerous fumes that gasoline-powered carts do. These positive features of electric carts make their use much preferred by supporters of the green movement. Although, electrically-powered open-air carts run quietly and cleanly, the majority of open-air carts are powered by gasoline engines. The present Inventor realized that gasoline-powered carts are favored because they can travel farther than electrically-powered carts before having to stop for refueling. Despite their many positive features, development of all electrically cars has remained stagnant.

Currently available electrically-powered golf cars offer a bank of batteries stored under the cart's seat, but are not designed or built to offer the space or the stability to be easily retrofitted to hold more electric power. These carts usually are able to travel between 15 and 30 miles on one charge depending on the terrain, the load that is being carried, and the age of the batteries. This means that a currently available electric cart will typically get around two hours of continuous motor run time before the batteries will need re-charging, which was acceptable when the carts were used solely on the golf course. Today, however, as mentioned above, more and more people are using their carts as their second car. This is especially true for those people living in communities that are designed to accommodate open-air cart transportation. This means cart users are likely to use their golf cart for several hours at a time, and, it must be taken into account that the number of electrically-powered cart accessories, such as stereos, lighting, fans, heaters, etc. also affect the running time of the battery bank. The present Inventor realized that until the run-time of electrically-powered carts is increased, gasoline powered carts will continue to be the first, even though not the optimum, option for cart buyers.

The present Inventor's desire for a more useful electrically-powered cart led to his inventive concept of an increased run-time electric cart. The concept resulted a set of inventive principles that provide for electrically-powered open-air carts to minimally travel about twice the distance they now can without having to recharge the cart's batteries. The concept resulted in what the Inventor refers to as his Battery Reserve System™.

In order to develop a functional, safe, and aesthetically pleasing Battery Reserve System™ for use with presently available carts, the inventive principles include a design, unique to each particular style of currently available cart, for a set brackets to securely support and fasten an extra group or bank of reserve batteries to the cart in a way that enhances the stability and balance of a cart that likely was built not to handle the extra bulk of a reserve battery bank. Additionally, the inventive principles provide for carts that are designed and built especially to accommodate additional or larger banks of reserve batteries. The inventive principles include providing a user the choice of using the Battery Reserve System™ batteries together with or separate from the battery bank that is provided in available carts. Yet another inventive principle is to position reserve batteries so as to make battery maintenance contact easily accessible including battery charging and watering the battery cells. Additionally, reserve batteries are positioned in the cart so as not to interfere with the use of the accessories that are included on most carts, and to provide for each Battery Reserve System™ to enhance the aesthetic appeal of the cart. The inventive principles include using a Battery Reserve System™ with larger, longer carts, as well as with currently available carts. One embodiment contemplated by the present invention is a cart that is elongated by adding to the space behind the seat. In this option reserve batteries are situated in reserve battery racks behind the seat back between the front and rear axle or above and behind the rear axle. Another style positions reserve batteries under a back seat of a multi-seat cart. Of course, it is to be understood that as the size of all-electric carts increases, the options for positioning additional reserve battery banks increases, such as if the cart has more than two seats, the options include positioning reserve batteries under any one of or under several of the additional seats. All of these variations are contemplated as long as the positioning of the reserve battery banks follows the inventive principles that include ensuring the reserve batteries do not disrupt the expected uses of the cart, will not negatively affect the balance and stability of the cart, will be able to connect, if desired to do so, to battery bank that is supplied in place under the front seat of a currently available electric cart with the reserve battery bank of the present invention, will provide for easy and convenient maintenance of the reserve batteries, and will add to, not distract from, the aesthetic appeal of the cart.

Accordingly, the present invention teaches a method for increasing a golf-cart's single battery bank size by adding one or a multiple of battery groups of the required voltage, comprising:

providing brackets,
the brackets structured to be attached to a framework of an open-air cart built to hold only a single battery bank,
attaching the brackets to the framework of the open-air cart built to hold only a single battery bank,
providing a bank of reserve batteries,
said bank of reserve batteries having the same voltage as the open-air cart's single battery bank,
inserting the bank of reserve batteries in the brackets,
wiring the bank of reserve batteries to the single battery bank forming an increased size battery bank, or wiring the bank of reserve batteries to run independently from the single battery bank,
wherein the travel distance of the open-air cart built to hold only a single battery bank is minimally increased to twice the distance provided by the cart's single set of batteries without requiring battery charging while maintaining the balance and stability of the open-air cart built to hold only a single battery bank.

The present invention also teaches a battery reserve system for use with a golf cart built to hold only a single battery bank, comprising:

A battery reserve system intended to be used with a golf cart built to hold only a single battery bank, comprising:
a bank of reserve batteries,
brackets,
the brackets endowed with a structure attachable to a framework of an electrically powered golf cart built to hold only a single battery bank having a finite travel time,
the brackets endowed with a structure supportive of the reserve batteries,
the bank of reserve batteries having the voltage of the single battery bank of the golf cart,
the bank of reserve batteries to cause a minimally double increase in the travel time without requiring an additional battery charge of the golf cart while maintaining the balance and stability of the golf cart when the brackets are attached to the golf cart, the bank of reserve batteries are inserted into the brackets, and the bank of reserve batteries are wired to the single battery bank to form an increased size battery bank, or when said bank of reserve batteries are wired to the single battery bank to run independently from the single bank of batteries.

Additionally, the present invention teaches a battery bank reserve system for use with an electrically powered open-air cart, comprising:

a reserve bank of batteries,
said reserve batteries having voltage required to increase an electrically powered open-air cart's travel distance without requiring additional battery charging to minimally twice the travel distance provided by the electrically powered open-air cart's initial battery bank, and
brackets,
said brackets having structure custom designed to be fit-able to and attachable to the framework of the electrically-powered open-air cart,
so that when said brackets are attached to the framework of the electrically powered open-air cart they will support said reserve batteries and maintain the balance and stability of the electrically-powdered open-air golf cart while increasing minimally twice the travel distance provided by the electrically powered open-air cart's initial battery bank without requiring additional battery charging.

The Battery Reserve System™ provided by the present invention, and illustrated exemplarily herein by a system designed and manufactured particularly for use with the Yama DRIVE® golf cart is uniquely positioned, supported, and secured behind the car-width seat adjacent to the golf-bag holding section.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which.

LISTING OF REFERENCE NUMBERS AND PARTS TO WHICH THEY REFER

Figure 1:
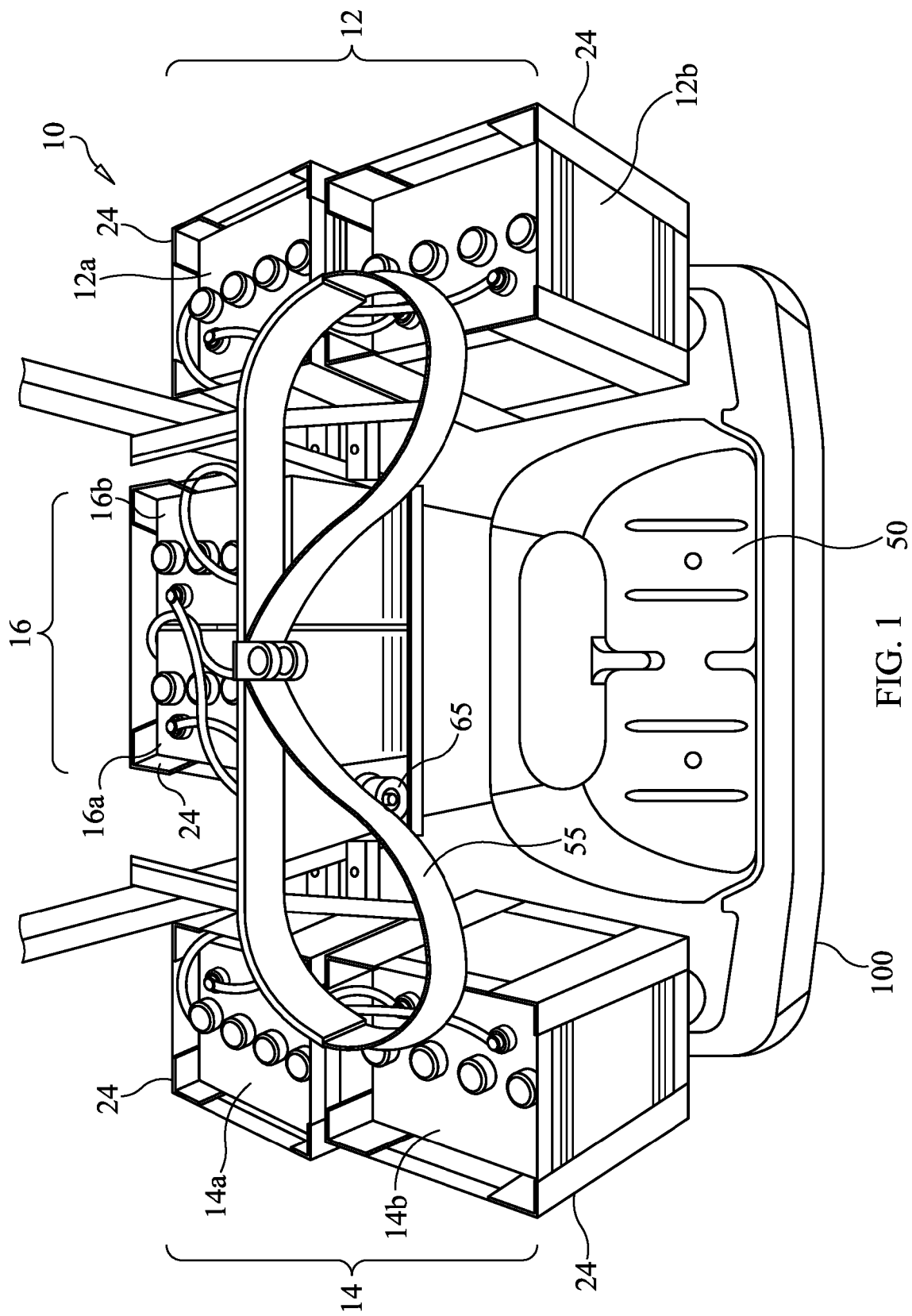
FIG. 1 is an elevated perspective view showing the back of a cart filled with a reserve battery bank.

10 Reserve battery bank.
12 Reserve batteries on passenger side of cart.
12a Front reserve battery on passenger side of cart.
12b Back reserve battery on passenger side of cart.
14 Reserve batteries on driver's side of cart.
14a Front battery on driver's side of cart.
14b Back battery on driver's side of cart.
16 Reserve batteries behind seat of cart.
16a Reserve battery behind seat on driver's side of cart.
16b Reserve battery behind seat on passenger's side of cart.
20 Golf cart seat
24 Reserve battery's support racks.
32 Cover for reserve batteries 12a and 12b.
34 Cover for reserve batteries 14a and 14b.
36 Cover for reserve batteries 16a and 16b.
50 Golf bag support area.
55 Golf bag support straps.
60 Protective panels.
65 Charger connection for charging reserve batteries.
70 Reserve battery disconnect switch.
72 Motor.
74 Battery bank 1.
76 Battery bank 2.
84 Battery group 1.
86 Battery group 2.
90 Enlarged battery bank.
100 Golf cart.

It should be understood that the drawings are not necessarily to scale. In certain instances, details which are not necessary for an understanding of the present invention or which render other details difficult to perceive may have been omitted.

DEFINITIONS

Golf cart and open-air cart, as used herein, refer to all the various types of small, low-speed, 4-wheeled motor vehicles with top speeds of about 15 to 25 miles per hour, and includes, but is not limited to, the following:

"Conventional golf cart" which means either a fleet golf car or a personal golf car, "Fleet golf cart" means a golf cart used solely to carry one or more people and golf equipment to play golf.

"Personal golf cart" means a golf cart used to carry one or more people and may carry golf equipment to play golf. These are sold to individual people who may use them to travel on public roads to and from golf courses and to play golf, to travel on public roads on purposes unrelated to golf, or for all of these purposes.

"Speed-modified golf cart" means a conventional golf cart that was modified, after its original manufacture, so as to increase its speed. While some speed-modified golf cars have a top speed of 20 to 25 miles per hour, others have a higher top speed. That modification may currently be accompanied by the addition of safety equipment required for the on-road use of the golf car.

"Neighborhood electric vehicle" means any 4-wheeled electric vehicle whose top speed is not greater than 25 miles per hour. Some of these vehicles look more like a passenger car than a conventional golf cart.

"Low-speed vehicle" means any 4-wheeled motor vehicle whose top speed is greater than 20 miles per hour, but not greater than 25 miles per hour. This group includes neighborhood electric vehicles, and speed-modified golf cars, whose top speed is greater than 20 miles per hour, but not greater than 25 miles per hour.

DETAILED DESCRIPTION

Referring now, with more particularity, to the drawings, it should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein.

Figure 2:
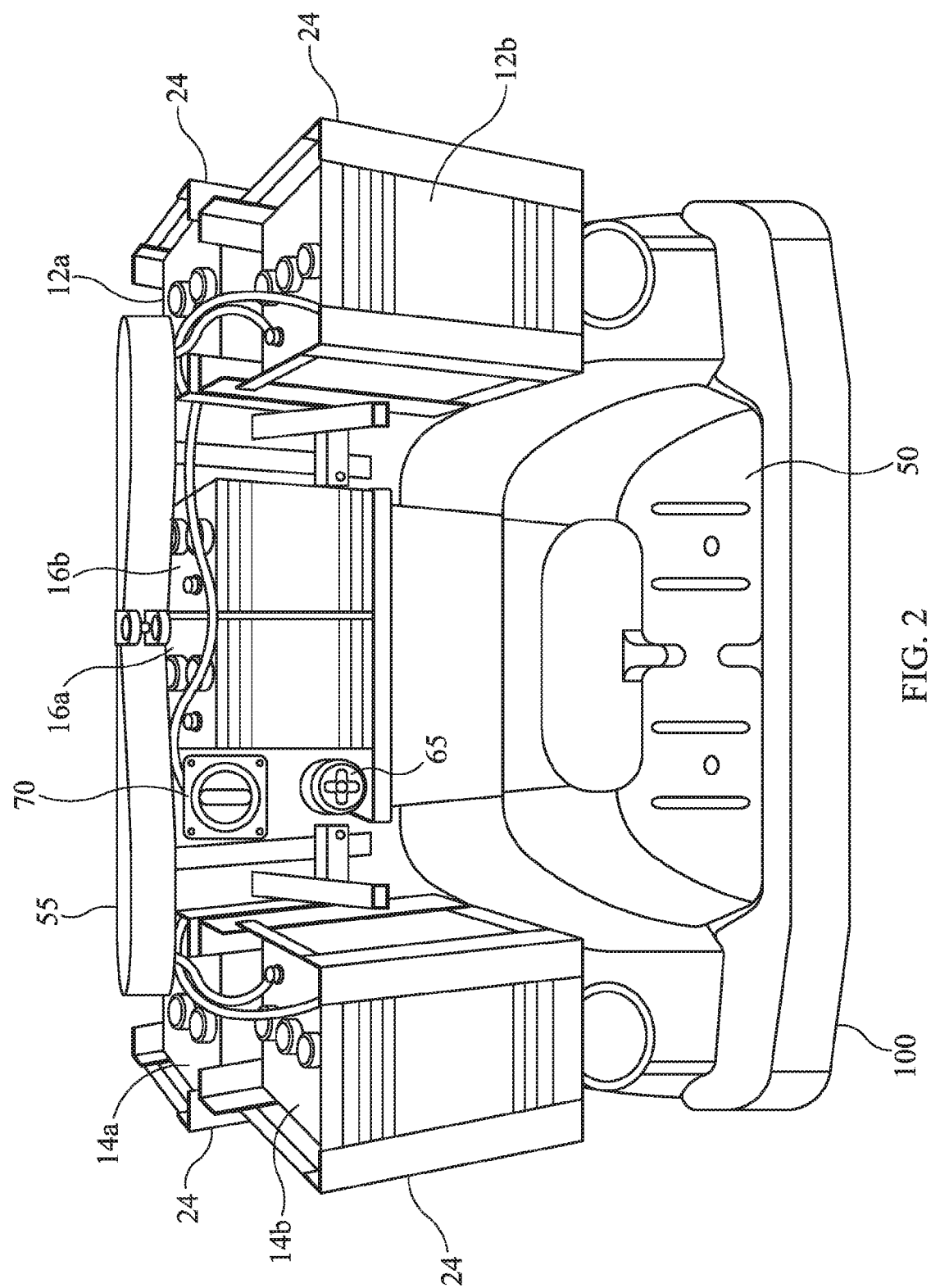
FIG. 2 is a perspective view of the back of the cart as shown in FIG. 1, showing a battery charger and battery bank switch.

It should be understood that currently available open-air, low speed, carts that are electrically powered with, or without, additional gas power are structured to hold a single battery bank. This means that the cart's structure is designed to achieve road stability and balance based on only the weight of a single battery bank, usually stored under the seat of the carts. Currently available carts also are carefully designed to provide room for use of expected accessories, such as golf bags, water bottles, and more recently, electronic accessories. Until the present invention, even though electrically powered cars were much favored because they run cleanly, quietly, and do not emit pollutants, noisy, dirty, and polluting gas carts make up the larger market share solely because gas powered carts have longer travel times before requiring refueling. Currently available electrically powered carts typically require refueling, as in recharging, in about two hours of travel time. And, with the use of these low-speed carts dramatically gaining in popularity for use off, as well as on, the golf course, this is a major factor in a user's decision to purchase a less desirable, more polluting gas car. Golf cart communities pride themselves on being clean and green. It is to this end that the present inventor invented a clean, noiseless, non-polluting battery reserve system for the low-speed carts that will minimally increase the drive-time of the cart by two hours without requiring additional charging and will do so while maintaining the safety of the cart by keeping the cart ground stable and balanced, and while maintaining the room needed for use of the expected accessories. Turning now to the drawings, FIG. 1 and FIG. 2 illustrate one example of a Battery Reserve System™ designed and manufactured especially to fit a Yama DRIVE® golf cart. Each Battery Reserve System™ includes a bank of "reserve batteries". This exemplar system includes six 8-volt reserve batteries secured by battery racks specifically designed to fit golf cart 100. The six 8-volt batteries make up a 48-volt reserve battery group 10 to be used with the batteries that come with electrically-powered cart 100. The battery banks currently supplied with electrically-powered carts are 48-volt banks, requiring any additional battery banks also to be 48-volt. The batteries of the present invention battery bank are positioned around the periphery of the back of the cart and are secured in racks. As shown, there is a set of two batteries 12 on the passenger's side of cart, battery 12a and battery 12b, a set of two batteries 14 on the driver's side of cart, battery 14a and battery 14b, and a set of two batteries 16 just behind cart seat 20, battery 16a and battery 16b. These batteries are connected in series and, in this example, are to be used independent of the battery bank that is supplied with the cart. Using the reserve batteries of the present invention independent from the battery bank supplied with the cart provides the user with an alert when one battery groups requires re-charging. Also illustrated is large space 50, used mainly for supporting golf bags secured by golf bag support straps 55. Also illustrated is battery charger connector 60 and battery bank switch 65. It is clearly obvious that the reserve batteries are positioned to be easily accessible for maintenance. It should also be understood that in addition to this example, the present invention also contemplates battery reserve systems for carts that are designed to accommodate more than a single battery bank.

Figure 3:
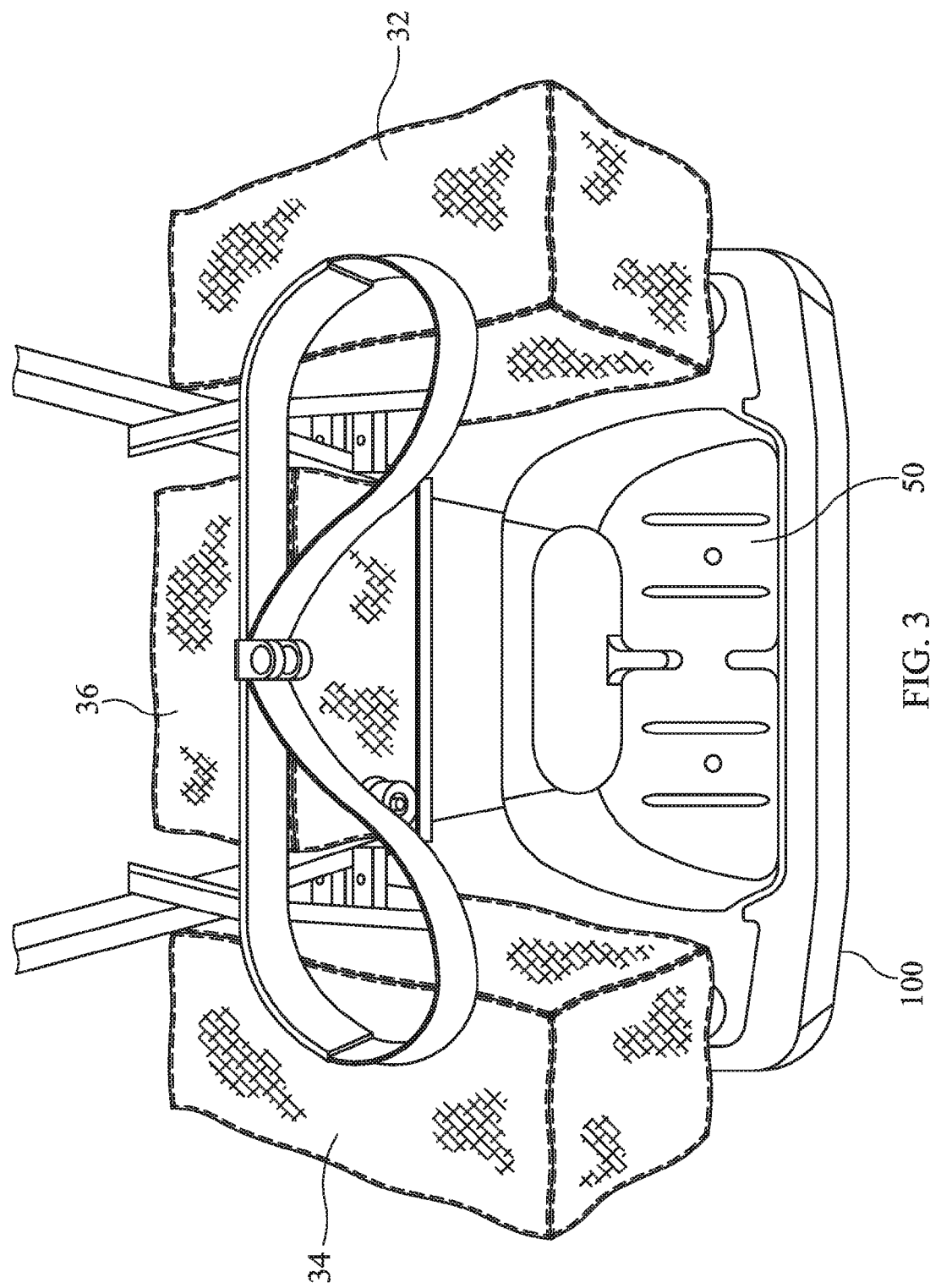
FIG. 3 is a perspective view showing the back of the cart filled with a covered reserve battery bank.

FIG. 3 illustrates the aesthetically pleasing and protective covered battery bank positioned in the back of the cart with cover 32 covering batteries 12a and 12b, cover 34 covering batteries 14a and 14b, and cover 36 covering batteries 16a and 16b. The look is clean and sophisticated clearly showing the adequate golf bag support area 50 with golf bag support straps 55. The covers are easy to remove when the batteries require maintenance and easy to replace. Various materials are used to manufacture the covers, as long as the material is suited for providing protection for the batteries from weather elements and is easy to clean.

Figure 4:
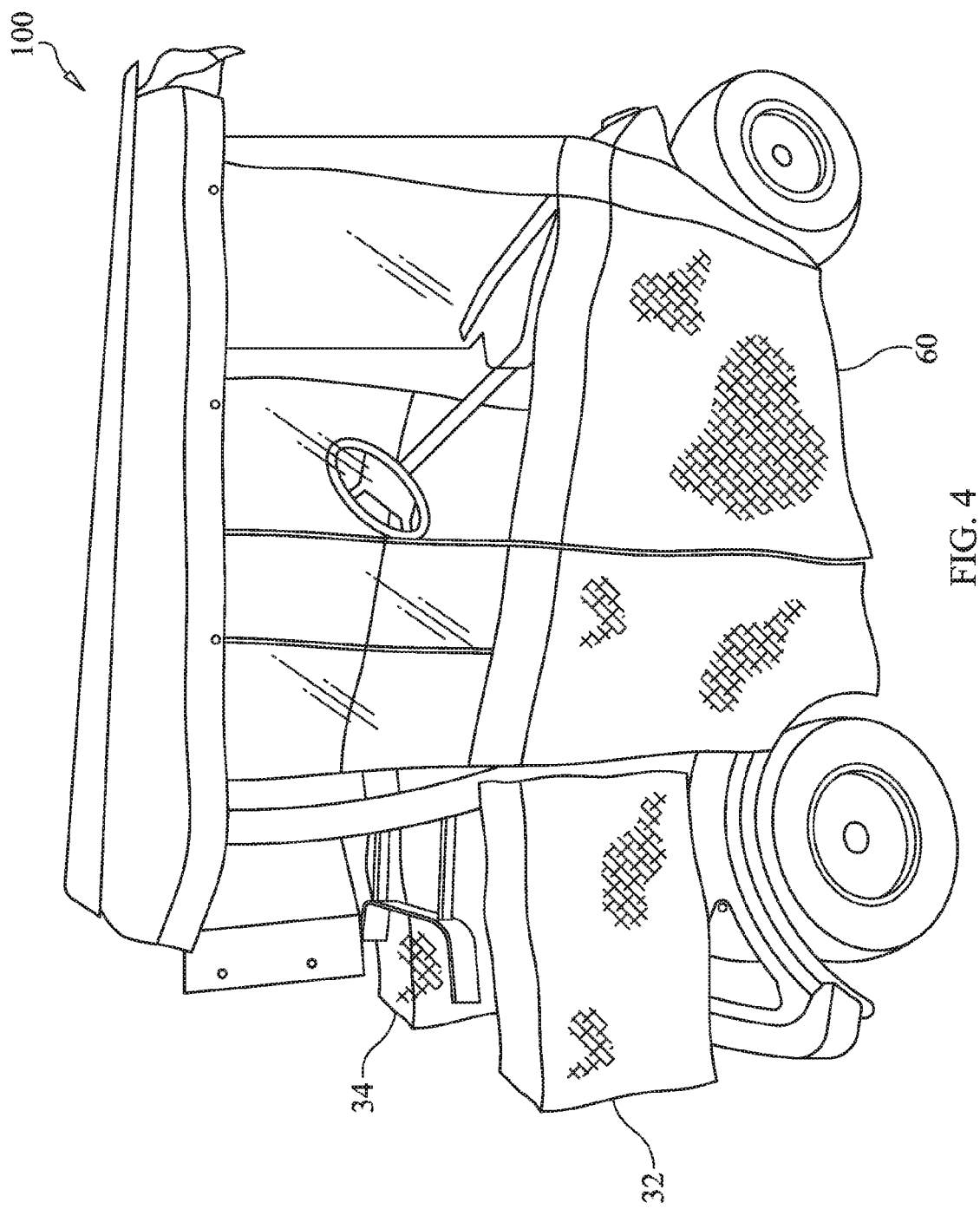
FIG. 4 is a perspective side view of the cart filled with a covered reserve battery bank, as shown in FIG. 3.

FIG. 4, illustrates the passenger side of a cart fitted with a 48-volt reserve battery to complement the 48-volt battery group that comes with the cart and how the covered battery bank adds to the fine looks of the cart.

The most popular Battery Reserve System™ design choices include systems having 48-volt battery banks of six 8-Volt batteries; four 12-Volt batteries, for maximum performance eight 6-Volt batteries. Golf carts to be provided with a Battery Reserve System™ are contemplated to be either currently available carts, including electrically powered or gas powered carts or carts that are designed specifically for accommodating one or more Battery Reserve System™ reserve battery banks. Depending on the golf cart that is going to be provided with a Battery Reserve System™ can have the reserve batteries positioned in battery racks that are behind the seat back or for elongated carts between the front and rear axle or above and behind the rear axle, as mentioned above. In elongated carts, the bag well is repositioned to accommodate the reserve batteries and the bag, as well as any additional seats. Reserve batteries can also be positioned on front of the car cowl.

Figure 5B:
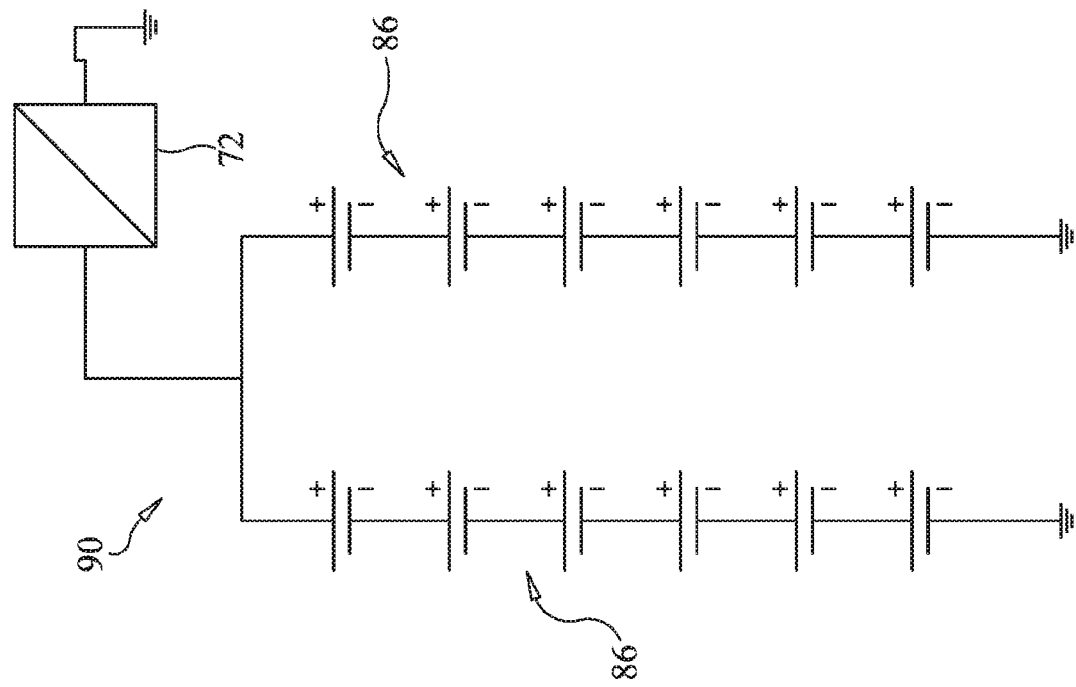
FIG. 5b is a wiring diagram showing two functionally connected six battery groups forming one enlarged battery bank.
Figure 5A:
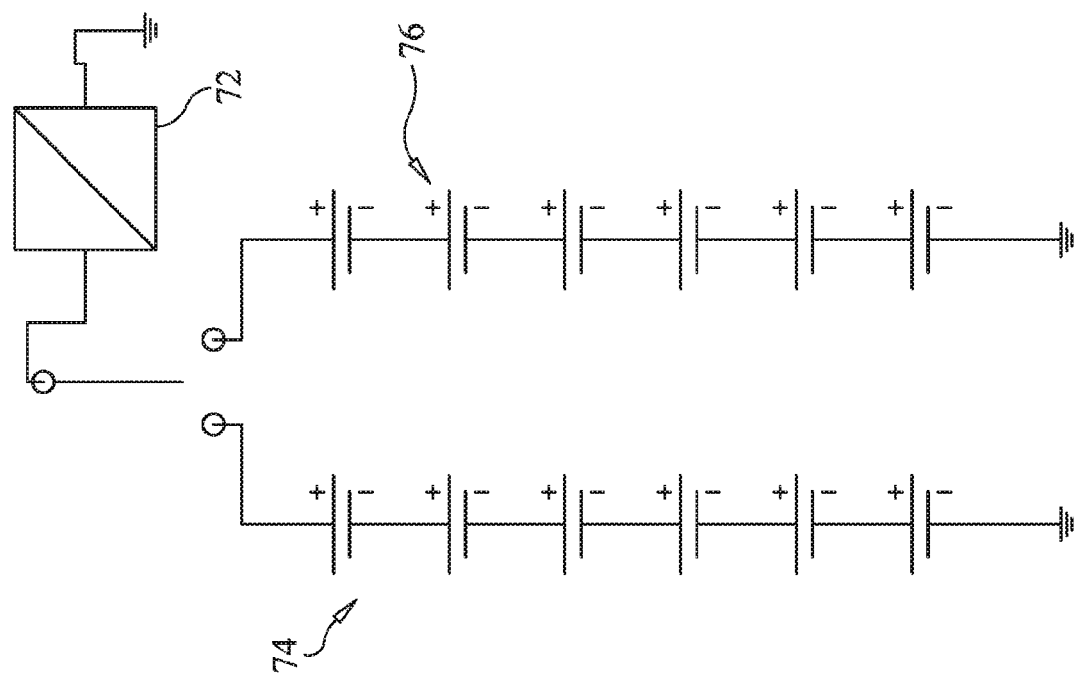
FIG. 5a is a wiring diagram showing two separate six battery banks.

FIG. 5a diagrammatically illustrates two battery banks, such as a reserve battery bank 74 and as supplied with cart battery bank 76, each bank having its six batteries wired in series. In this diagram, the two banks are illustrated as separately functioning banks each capable of running motor 72. If desired, the two banks can be connected in parallel by action of battery disconnect switch 70, as illustrated in FIG. 2. In other examples (not shown), especially for use in elongated carts, there can be one or more additional reserve banks. FIG. 5b illustrates enlarged battery bank 90 constituting one six battery group 84 and another six battery group 86 with the batteries within each group connected in series. Multiple battery groups can be added to make the bank larger, as long as all of the battery groups meet the required voltage. In the examples illustrated, each of the six batteries is an 8-volt battery providing a 48-volt battery bank. Battery banks of 48-volts also can be made using four 12 volt batteries or eight 6-volts. In the past, electric carts using 36 volt battery banks made up of six 6-volt batteries were in vogue. Cars with 48 volt systems get longer battery life than cars with 36-volt systems and 48-volt golf cars (Club Car & Yamaha) use one-third less amperage than the 36-volt system and are more efficient. Gas golf carts utilize one 12-volt battery.

Figure 6:
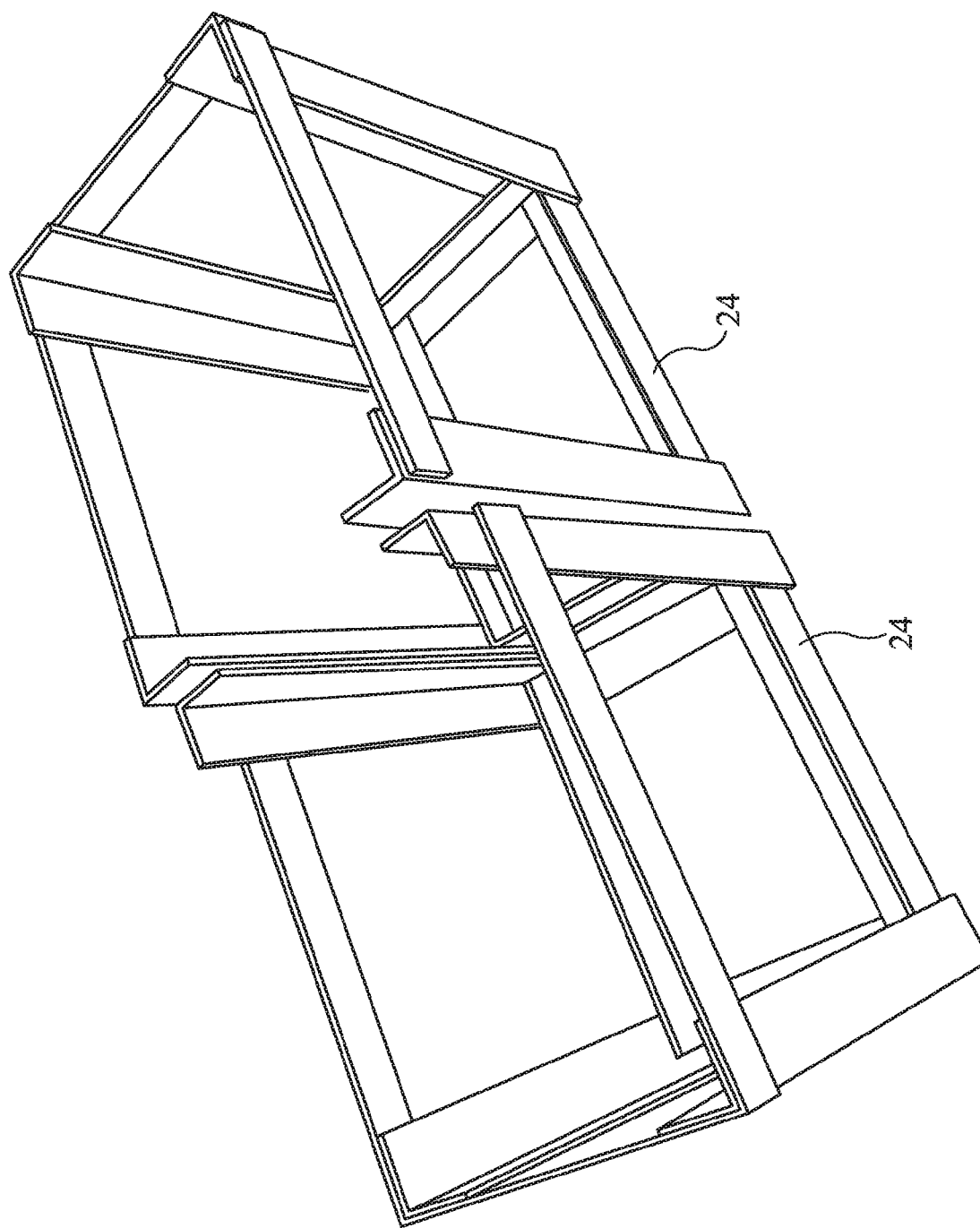
FIG. 6 is a perspective view of one of the reserve battery set's support racks.

FIG. 6 diagrammatically illustrates battery support racks 24 constructed to be added to, or as part of, the framework that securely support the reserve batteries of the present invention on a cart. As in the illustrated example, when the battery racks of the Battery Reserve System™ are added to the framework of an available gold cart the racks or brackets are structured to be installer friendly in that all of the reserve battery support brackets are installed on a cart so that each bracket is easily accessible for addition of a reserve battery. Once the reserve batteries are in place in their respective bracket, the batteries and brackets and encased in decorative and protective weather repellant material chosen to complement each particular cart, there remains amble space and support for food and water coolers and "seed and sand" bottles and coolers. And even with these added benefits, a Battery Reserve System™ equipped cart remains road stable.

Proper battery maintenance requires regular recharging of the batteries. However, during the recharging process, as electricity flows through the water portion of the electrolyte and water, the water is converted into its original elements, hydrogen and oxygen, which causes water loss and therefore lead acid batteries need to have water added periodically. In the present system it is never difficult to add water to the reserve batteries. The Battery Reserve System™, as taught herein, is designed to take advantage of a single point watering system the Pro-Fill On-Board Battery Watering System which is specifically designed for use with golf cart style batteries. The Pro-Fill on-board battery watering system works by replacing the battery's existing vent caps with valves that are interconnected with tubing, allowing the user to fill all cells of the battery from a single remote location providing for batteries to be filled in 30 seconds or less. Each valve independently shuts off water flow to the cell when the proper electrolyte level is reached, allowing the batteries to be filled perfectly every time without having to look at the batteries providing cost benefits including extended battery life; increased performance; and cleaner floors, equipment and battery tops. Filling batteries without having to remove the vent covers avoids battery acid burns, ruined clothing, and noxious fumes.

A lithium-ion battery (sometimes referred to Li-ion battery or LIB) is another battery that works well with the present invention. Lithium-ion batteries are members of a family of rechargeable battery types in which lithium ions move from the negative electrode to the positive electrode during discharge and back when charging. Lithium-ion batteries are common in consumer electronics and are one of the most popular types of rechargeable batteries due to their high energy density, small memory effect, and only a slow loss of charge when not in use. Lithium-ion batteries are an ideal replacement for the lead acid batteries that have been used historically for golf carts and utility vehicles. Instead of heavy lead plates and acid electrolyte, the trend is to use lightweight lithium-ion battery packs that can provide the same voltage as lead-acid batteries, so no modification to the vehicle's drive system is required. Various open-air cart accessories add substantial weight to a cart. For example, when a "rear facing seat kit" is added to a cart and used to seat two extra people, up to 500 pounds could easily be added to the weight of the cart. In such instances, dealers recommend that the shock absorber type springs that are traditionally provided on such carts be replaced with more heavy duty springs, such as leaf springs. However, using lithium-ion batteries according to the inventive concepts of the present invention would not require the addition of heavy duty springs.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods, as described above, of making the embodiments of the invention described herein without departing from the spirit and scope of the invention. Furthermore, it is within the invention concept and invention principle to include all the variations, methods, modifications, and combinations of features within the scope of the appended claims. The invention is limited only by the claims.

What is claimed is:

1. A method for increasing an open-air cart's electrically powered travel time minimally about twice the distance without having to recharge the cart's batteries by adding one or a multiple of additional battery groups of the required voltage to the cart, comprising:
    providing brackets,
        said brackets structured to be attached to a framework of a an open-air cart built to hold only a single battery bank,
    attaching said brackets to the framework of the open-air cart built to hold only a single battery bank,
    providing a bank of reserve batteries,
        said bank of reserve batteries having the same voltage as the golf cart's single battery bank,
    inserting said bank of reserve batteries in said brackets,
    wiring said bank of reserve batteries to the single battery bank forming an increased size battery bank, or wiring said bank of reserve batteries to run independently from the single batter bank,
    said bank of reserve batteries increasing the electrically powered open-air cart's travel distance minimally to twice the distance provided by the cart's single battery bank without requiring battery charging while maintaining the balance and stability of the golf cart built to hold only a single battery bank.

2. The method, as recited in claim 1, wherein said open-air cart built to hold only a single bank of batteries is a golf cart.

3. The method, as recited in claim 1, wherein positioning said reserve batteries in the open-air cart built to hold only a single battery bank does not to interfere with the use of the accessories that are included on the open-air cart built to hold only a single bank of batteries.

4. The method, as recited in claim 1 wherein said reserve batteries are positioned to be accessible for maintenance.

5. The method, as recited in claim 1, wherein said reserve bank of batteries is a 48-Volt group.

6. The method, as recited in claim 5, wherein said bank of reserve batteries is a group of six 8-Volt batteries.

7. The method, as recited in claim 5, wherein said bank of reserve batteries is a group of four 12-Volt batteries.

8. The method, as recited in claim 5, wherein said bank of reserve batteries is a group of eight 6-Volt batteries.

9. The method, as recited in claim 1, further including installing a battery disconnect switch on the open-air cart built to hold only a single battery bank for connecting or disconnecting the bank of reserve batteries with the single battery bank of the open-air cart built to hold only a single battery bank.

10. A battery reserve system intended to be used with a golf cart built to hold only a single battery bank, comprising:
    a bank of reserve batteries,
    brackets,
        said brackets endowed with a structure attachable to a framework of an electrically powered golf cart built to hold only a single battery bank having a finite travel time,
        said brackets endowed with a structure supportive of said reserve batteries,
        said bank of reserve batteries having the voltage of the single battery bank of the golf cart,
        said bank of reserve batteries to cause a minimally double increase in the travel time without requiring an additional battery charge of the golf cart while maintaining the balance and stability of the golf cart when said brackets are attached to said golf cart, said bank of reserve batteries are inserted into said brackets, and said bank of reserve batteries are wired to the single battery bank to form an increased size battery bank, or when said bank of reserve batteries are wired to the single battery bank to run independently from the single bank of batteries.

11. The battery reserve system, as recited in claim 10, wherein the golf cart built to hold only a single bank of batteries is a golf cart having an elongated body.

12. The battery reserve system, as recited in claim 10, further having said reserve batteries positioned in the golf cart built to hold only a single bank of batteries not interfering with the use of the accessories that are included on golf cart built to hold only a single bank of batteries.

13. The battery reserve system, as recited in claim 10, further having said reserve batteries positioned to be accessible for maintenance.

14. The battery reserve system, as recited in claim 10, wherein said reserve bank of batteries is a 48-Volt bank.

15. The battery reserve system, as recited in claim 10, further including a battery disconnect switch for connecting or disconnecting the reserve battery bank with the initial battery bank of the golf cart built to hold only a single bank of batteries.

16. The battery reserve system, as recited in claim 10, further having said reserve batteries positioned to be accessible for battery maintenance.

17. A battery bank reserve system for use with an electrically powered open-air cart, comprising:

a reserve bank of batteries,
said reserve batteries having voltage required to increase an electrically powered open-air cart's travel distance without requiring additional battery charging to minimally twice the travel distance provided by the electrically powered open-air cart's initial battery bank, and
brackets,
said brackets having structure custom designed to be structurally fit-able with attachable to the framework of the electrically-powered open-air cart,
so that when said brackets are attached to the framework of the electrically powered open-air cart they will support said reserve batteries and maintain the balance and stability of the electrically-powdered open-air golf cart while increasing minimally twice the travel distance provided by the electrically powered open-air cart's initial battery bank without requiring additional battery charging.

18. The battery reserve system, as recited in claim 17, wherein said open-air cart built to hold only a single bank of batteries is a golf cart.

19. The battery reserve system, as recited in claim 17, further including a battery disconnect switch for connecting or disconnecting the reserve battery bank with the single battery bank of the electrically powered open-air cart.

20. The battery reserve system, as recited in claim 17, wherein said reserve bank of batteries is a 48-Volt bank.

* * * * *